United States Patent Office 2,759,978
Patented Aug. 21, 1956

2,759,978
PRODUCTION OF CHLORAL

Henry C. Stevens and Andrew J. Kaman, Akron, and John W. Sellers, Uniontown, Ohio, assignors to Columbia-Southern Chemical Corporation No Drawing. Application May 11, 1953,
Serial No. 354,382

6 Claims. (Cl. 260—601)

The present invention relates to a novel method for producing chloral.

According to the present invention, chloral may be prepared by reaction of hypochlorous acid and trichloroethylene. Notably, this reaction is performed in the liquid phase, e. g., with the temperature of the reaction being such that the reacting mass is liquid. As will become more apparent, the reaction temperature may be varied widely as long as it permits the presence of a liquid phase in the reaction mixture.

In accordance with this invention, hypochlorous acid and trichloroethylene are brought in contact and permitted to react in a liquid phase. This may be achieved, for example, by mixing trichloroethylene and hypochlorous acid at a temperature between the freezing and boiling points of trichloroethylene when the acid is added to a pool of the trichloroethylene.

In a preferred expedient for accomplishing the desired reaction, aqueous solutions of hypochlorous acid are employed as one of the reagents. Thus, an aqueous solution of hypochlorous acid and trichloroethylene may be introduced into a reaction zone and permitted to react. Generally, however, it is advantageous to add trichloroethylene to a pool of aqueous hypochlorous acid. Alternatively, the aqueous acid solution may be introduced into a pool of trichloroethylene. In the former procedure, the temperature of the pool is between about plus 30° C. and minus 40° C., such that the aqueous acid does not solidify. Within this temperature range, the specific minimum temperature employed is related to the concentration of the acid, with more concentrated acid solutions permitting the lower temperatures by depressing the freezing point of the solution.

It has been found that practice of this embodiment of the invention requires that concentrated solutions of aqueous hypochlorous acid be utilized. Solutions of 1 molar strength and above are necessary, and as used herein, the phrase "concentrated solutions of hypochlorous acid" is meant to define solutions of at least 1 molar strength. Preferably, solutions of about 3 molar or stronger are used. The hypochlorous acid should be maintained at such strengths for at least the major portion of the reaction, e. g., at least 50 per cent conversion of one of the reactants. In this regard, it may be noted that aqueous solutions of chlorine are not suitable for use in performing the reaction with trichloroethylene even though some hypochlorous acid may be present therein by virtue of reaction of elemental chlorine with water. Moreover, elemental chlorine is undesirable and the aqueous solutions of hypochlorous acid should not contain any appreciable quantity of elemental chlorine. An aqueous solution of hypochlorous acid which contains less than 10 parts per million of chlorine by weight of the HOCl is preferred, and for purposes of this invention an acid having such an elemental chlorine content is considered to contain essentially no elemental chlorine.

Elemental chlorine appears to more readily react with trichloroethylene than hypochlorous acid under normal reaction conditions and, therefore, should not be present in the reaction medium. Complete absence of elemental chlorine is preferred. However, the reaction may be performed in the presence of some elemental chlorine if the equivalents of the reactants exceed the chlorine equivalent. For example, if one mole of hypochlorous acid and one mole of trichloroethylene are present in the reaction mixture and the amount of elemental chlorine therein is below one mole, chloral may be produced. A decrease in yield, however, may be expected when elemental chlorine is present.

Normally, the hypochlorous acid is treated to insure the absence of appreciable quantities of elemental chlorine, and preferably the total absence thereof. One expedient that is used involves blowing air through the acid which has been cooled, such as by contact with an ice bath. The elemental chlorine content of the acid may be determined for example, by taking a sample of the treated acid, adding a potassium iodide solution, titrating to the disappearance of color with a sodium thiosulfate solution, adding some hydrochloric acid, and completing the titration.

It appears that yield of chloral is related to the concentration of hypochlorous acid, with higher concentrations apparently favoring increased yields of chloral. Usually it is beneficial to employ acid solutions of strengths in excess of about three molar. It further appears that the concentration of the acid in the liquid phase of the reacting mass is related to the yield. At higher acid concentrations, more favorable yields appear possible.

One embodiment of this invention takes advantage of the above-outlined apparent effects on yield by introducing trichloroethylene into a pool of aqueous hypochlorous acid, notably a solution having a strength of at least 3 molar. In this manner, higher concentrations of acid in the reaction mixture may be attained. Adjunct to this expedient is the addition of less than theoretical amounts of trichloroethylene (or an excess of hypochlorous acid), so that the conversion is performed while the mixture contains high concentrations of hypochlorous acid.

The reaction of hypochlorous acid and trichloroethylene is equimolar, one mole of each reagent reacting. Thus, this invention is performed by employing equimolar ratios of the reactants. Under certain circumstances, such as the one described in the preceding paragraph, an excess of hypochlorous acid may be utilized. It will, of course, be realized that any ratio of reactants is suitable as far as preparing chloral is concerned.

Temperatures as low as about minus 40° C. may be employed when trichloroethylene is added to a pool of liquid aqueous hypochlorous acid solution. When such low temperatures are employed, concentrated acid solutions are required to avoid solidification. Typically at about minus 20° C., a 7.7 molar solution of hypochlorous acid is suitable to preclude freezing. Above 0° C., the minimum concentration of acid that may be employed is chosen in accordance with the freezing point curve of the acid solution.

Recovery of chloral from the reaction mixtures is possible in accordance with several techniques. For example, the chloral may be separated by extraction with a suitable solvent, e. g., ethyl ether and thereafter evaporating the solvent leaving the product. The chloral may be recovered by fractional distillation of the reaction mixture after first neutralizing the mixture (notably unreacted hypochlorous acid).

Chloral may be isolated from the aqueous distillate obtained when the reaction mixture is fractionally distilled by adding benzene, n-hexane, or other entrainant to the aqueous solution and performing an azeotropic distillation until the water is removed. The remaining bottom mixture may thereafter be distilled to recover the purified chloral. It is also possible to recover chloral by addition of sulfuric acid to the aqueous distillate, and thereafter distilling the mixture.

The following examples illustrate the manner in which this invention may be performed:

Example I

Five moles (657 grams) of essentially pure trichloroethylene were placed in a three-necked, three-liter flask provided with a paddle-type stirrer, adding funnel, thermometer, and gas outlet tube. The gas outlet was connected to a carbon dioxide-acetone cooled trap. The flask was disposed in an ice salt bath and the contents were cooled to 5° C.

To the cooled charge, with the stirrer operating, was added 1,615 milliliters of 3.1 molar aqueous hypochlorous acid solution over a period of 105 minutes via the adding funnel while maintaining the temperature at 5° C. to 10° C. This acid solution was previously treated to remove elemental chlorine by blowing air through it while cooling it in an ice bath. The temperature of the reaction mixture was held at 5° C. to 10° C. for 50 additional minutes. To neutralize the unreacted hypochlorous acid (analysis of a sample revealed that 94.5 per cent of the acid had reacted), 270 milliliters (0.32 mole) of an aqueous solution of sodium sulfite containing 15 per cent by weight of sodium sulfite was added.

The organic layer was separated and washed twice with 100 milliliters of water. This was washed further with 100 milliliters of an aqueous sodium carbonate solution containing 10 per cent by weight of sodium carbonate, 50 milliliters of water and then 100 milliliters of saturated aqueous sodium chloride solution (at room temperature). All the washings were extracted with 100 milliliters of ethyl ether, the ether extract being combined with the organic layer, and the mixture was dried over anhydrous sodium sulfate.

The aqueous layer was extracted with a 50-milliliter portion of petroleum ether (B. P. 35–70° C.) to remove any trace of pentachloroethane that might be present. Chloral hydrate is relatively insoluble in petroleum ether. A solution containing chloral hydrate and 2,100 milliliters in volume was obtained. It was divided in two equal parts, each portion being treated differently.

One part (1,050 milliliters) was extracted twice with 1,000-milliliter portions of ethyl ether. After treating the ether extract with two 50-milliliter portions of an aqueous solution of sodium carbonate containing 10 per cent by weight of sodium carbonate, the ether was removed from the extract by heat distilling through a column to a maximum residue temperature of 80°–85° C. Analysis indicated that 96 grams (0.65 mole) of chloral was in the residue.

The second part was distilled in a 1.2 x 90 centimeter Todd column until the refractive index of the distillate was 1.3332, indicative that all chloral had been removed. This required distillation until 524 milliliters of distillate had been collected. The yield of chloral, determined by analysis of the refractive index of the distillate indicated 102.2 grams (0.69 mole) were prepared.

The water insoluble phase (organic phase) was distilled in a 2.5 x 70 centimeter column packed with glass helices at barometric pressure (737 millimeters mercury) to determine the composition thereof. About 0.43 mole trichloroethylene, 2.53 moles pentachloroethane, and 0.06 mole dichloroacetyl chloride were recovered.

Overall, approximately 91 per cent of the olefin was converted. Based on the olefin conversion, the yield of chloral was about 30 per cent.

Example II

A series of experiments were conducted following the general procedure described in Example I to illustrate various modes of performing the reaction.

The following table lists these experiments, the variation in procedure, and the results:

| Exp. No. | Method | HOCl Concentration, (Molarity) | Trichloroethylene Conversion, Percent | Yields based on Trichloroethylene Consumed, percent | |
|---|---|---|---|---|---|
| | | | | Chloral | Pentachloroethane |
| 44 | Similar to Example I except trichloroethylene added to HOCl | 3.4 | 81 | 40 | 44 |
| 53 | Same as No. 44 except temperature = 15–20° C | 2.8 | 73 | 37 | 52 |
| 54 | Same as No. 53 with no stirring after addition of trichloroethylene finished | 3.1 | 69 | 38 | 48 |
| 57 | Duplicate of No. 44 except temperature was minus 5° to minus 8° C | 3.2 | 69 | 44 | 48 |
| 58 | Same as No. 54 except 1.5 molar HOCl | 1.5 | 50 | 28 | 62 |
| 59 [1] | Trichloroethylene added to 7.7 molar HOCl at minus 18° to minus 29° C | 7.7 | 97 | 73 | 21 |

[1] In this experiment, only 0.59 mole of trichloroethylene added per mole of HOCl in the reaction mixture.

While the invention has been described with reference to batchwise operations, the reaction of HOCl with trichloroethylene to prepare chloral may be performed in a continuous manner by establishing a reaction zone containing an appropriate reaction medium and withdrawing a portion of that medium continuously or periodically to the zone at appropriate rates. After recovering the product, the unreacted reagents may be appropriately purified if necessary, and recycled to the zone as a portion of the fresh reagents being added.

Although the invention has been described with reference to certain details of specific embodiments, such details are not intended to be construed as limitations thereon except insofar as they are included in the accompanying claims.

We claim:

1. The method of reacting hypochlorous acid and trichloroethylene to produce chloral which comprises adding trichloroethylene to a liquid pool containing an aqueous concentrated solution of hypochlorous acid.

2. The method of preparing chloral which comprises reacting trichloroethylene and an aqueous concentrated solution of hypochlorous acid.

3. The method of claim 2, wherein the hypochlorous acid solution is essentially free from elemental chlorine.

4. The method of preparing chloral which comprises reacting trichloroethylene and an aqueous concentrated solution of hypochlorous acid, the molarity of said hypochlorous acid solution being at least about 3.0.

5. The method of reacting hypochlorous acid and trichloroethylene to produce chloral which comprises adding trichloroethylene to a liquid pool containing an aqueous concentrated solution of hpyochlorous acid, the concentration of said acid solution being at least about 3.0 molarity throughout a major portion of the reaction period.

6. The method of claim 5 wherein the acid solution is essentially free from elemental chlorine.

References Cited in the file of this patent

UNITED STATES PATENTS 1,806,285  Ernst et al. _____ May 19, 1931